Dec. 5, 1933.   J. A. ADELL   1,938,445
MEASURING DEVICE FOR TEXTILES AND THE LIKE
Filed Aug. 16, 1929   3 Sheets-Sheet 1
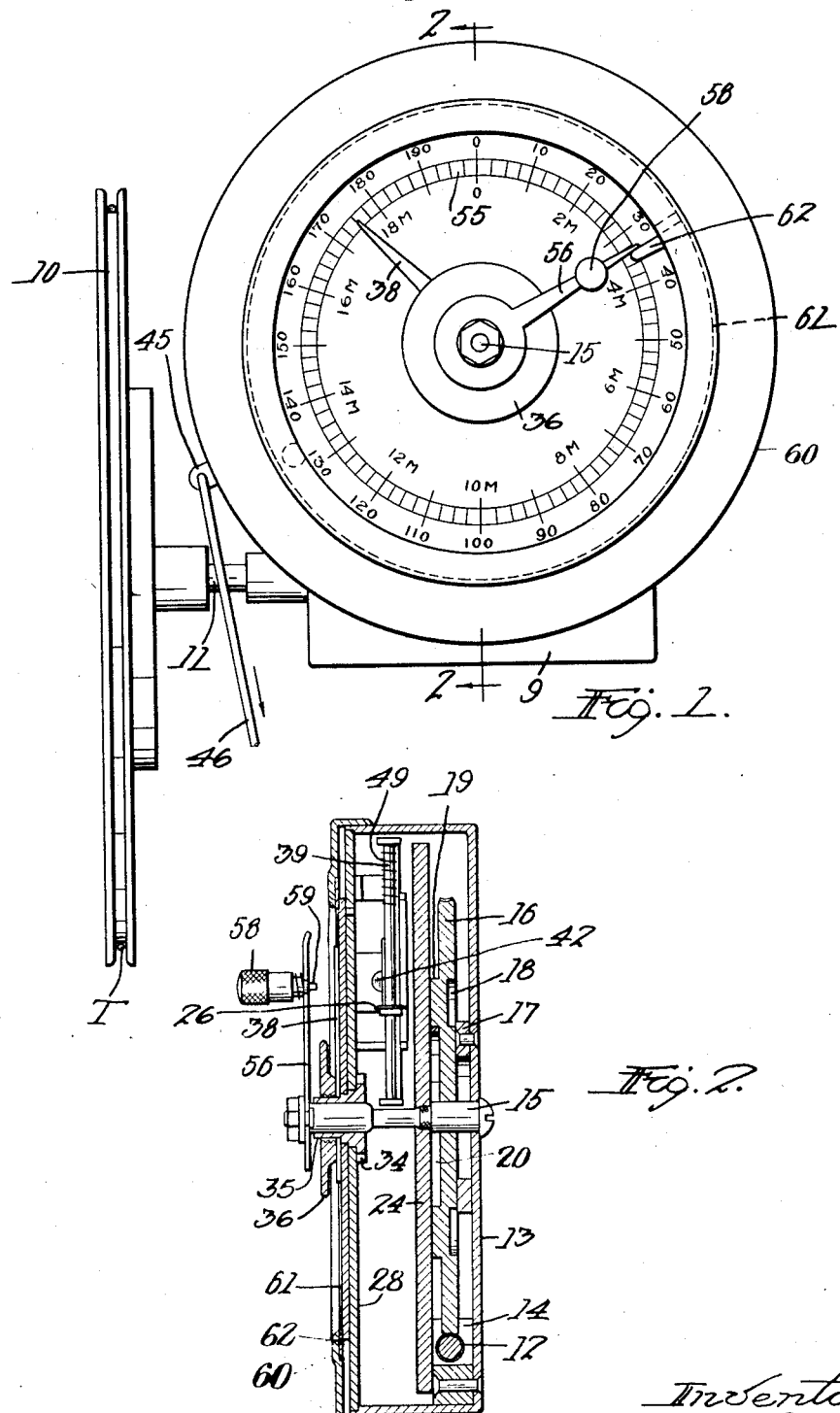

Dec. 5, 1933.     J. A. ADELL     1,938,445
MEASURING DEVICE FOR TEXTILES AND THE LIKE
Filed Aug. 16, 1929     3 Sheets-Sheet 2

Dec. 5, 1933.　　　　　J. A. ADELL　　　　　1,938,445
MEASURING DEVICE FOR TEXTILES AND THE LIKE
Filed Aug. 16, 1929　　　3 Sheets-Sheet 3
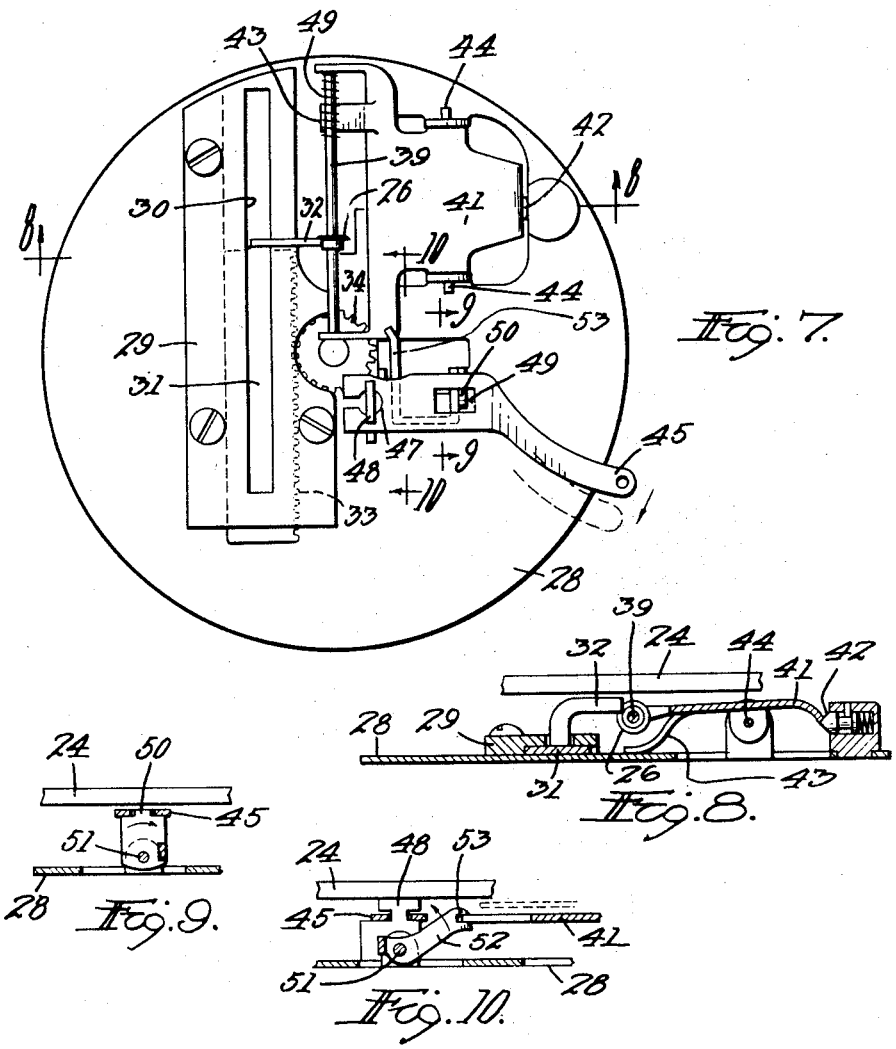

Patented Dec. 5, 1933

1,938,445

UNITED STATES PATENT OFFICE 1,938,445

MEASURING DEVICE FOR TEXTILES AND THE LIKE

John A. Adell, Orange, Mass.

Application August 16, 1929. Serial No. 386,277

12 Claims. (Cl. 33—132)

This invention relates to a device for measuring thread, yarn, cloth and the like, and to count rotation, and the principal objects thereof are to provide a simplified construction for stopping the operation when a predetermined number of yards have been measured; to provide a construction for this purpose which will eliminate the use of gears and wire clutches and also to provide it in a form in which the number of parts is reduced to a minimum and the use of a wire clutch and other complications heretofore thought necessary are avoided.

Other objects and advantages of the invention will appear hereinafter.

Reference is to be had to the accompanying drawings in which

Fig. 1 is a front view of a measuring device constructed in accordance with this invention;

Fig. 2 is a diametrical sectional view on the line 2—2 of Fig. 1;

Fig. 7 is a face view of the feeding and stopping mechanism;

Fig. 8 is a sectional view of the same on the line 8—8 of Fig. 7;

Fig. 9 is a sectional view on the line 9—9 of Fig. 7;

Fig. 10 is a sectional view on the line 10—10 of Fig. 7;

Fig. 11 is a view of the plate shown in Fig. 7 but looking at the other side, and Fig. 12 is a view similar to Fig. 8, showing the parts in a different position.

Figure 3:
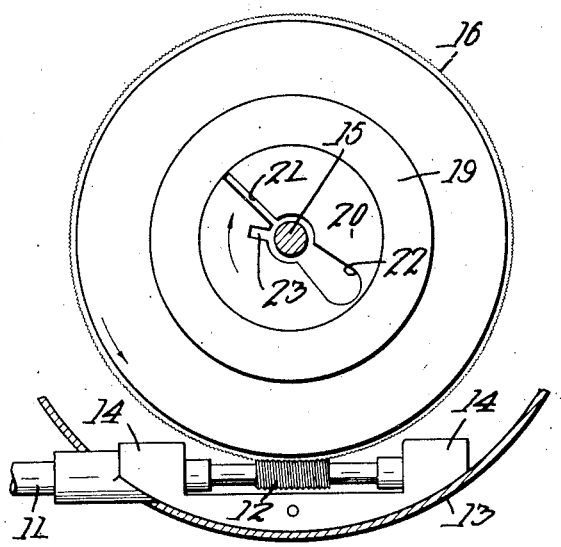
Fig. 3 is a face view of a worm wheel and clutch constituting a part of the invention.
Figures 4, 5:
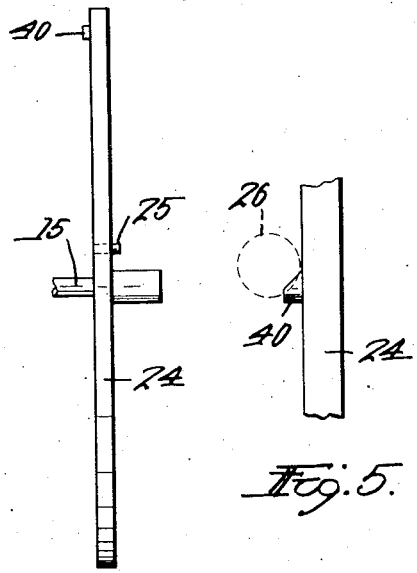
Fig. 4 is an edge view of a scroll wheel.
Fig. 5 is an enlarged edge view of a portion of the same, showing the method of stopping the machine.

This machine is intended for measuring the amount of thread or yarn T which passes around a measuring wheel 10. This measuring wheel is of an ordinary character having a V-shaped groove around its circumference in which the yarn is usually given several turns, it being understood that the yarn comes from another wheel having a groove and that the wheel 10 has a definite circumference and in one revolution thereof measures that length of yarn, as for example, one-half yard. When this wheel turns one revolution therefore, one-half a yard of yarn has been passed around it and measured. This wheel delivers to another machine, such as a winding machine, which turns the wheel by drawing the yarn over it.

This wheel 10 is mounted on a shaft 11 on which is a worm 12 located in a circular casing 13 having bearings 14 for this shaft. The casing 13 stands vertically on a base 9. In this casing 13 is a central shaft 15 on which is mounted to freely rotate a worm wheel 16 meshing with the worm and having a fine thread. Therefore a single rotation of the wheel 10 will be transmitted to the worm wheel 16 and rotate it one thread space. This wheel 16 has a flat face at one side rotating against a ring 17 fixed to the back of the casing 13 and constituting a flat bearing therefor. The wheel 16 is upset to form an annular groove 18 on one side, which in itself has no function, but this upsetting provides an annular projection 19 on the other side.

Within this projection is located a clutch disc 20. This clutch disc is perforated at the center, so that it will have no bearing on the shaft 15 and provided with a radial slit 21, so that it can be expanded or contracted and this slit extends at the other side in the form of a slot 22 so that there is only a thin piece of metal to connect the two halves of this disc. The disc is also provided with a radial slot 23 by which the disc can be turned. This disc is set in the central circular space within the annular projection 19. Obviously, if some instrument is inserted in the slot 23 and pushed in one direction, that is, the direction away from the slit 21, it will expand the clutch disc and prevent its turning in its circular space, but if pushed in the direction toward the slit, it will contract the disc and the disc can be turned in that direction only. In order for the disc 20 to engage the annular projecting flange 19, for driving, the disc 20 has to be initially expanded.

Figure 6:
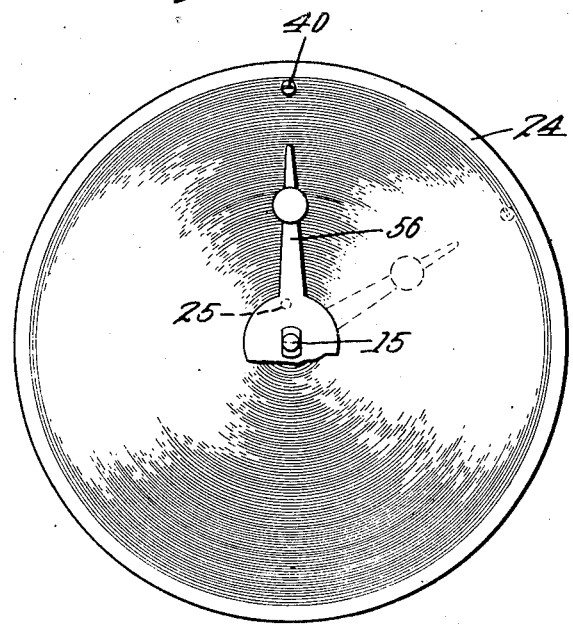
Fig. 6 is a face view of the scroll wheel and one of the pointers for use therewith.

The shaft 15 also carries fixed thereon a scroll wheel 24 which is provided with a pin 25 entering the slot 23. Therefore the scroll wheel can be turned, forwardly but not backwardly. This scroll wheel is provided with a spiral scroll groove, indicated in Fig. 6, on the front face thereof for cooperation with a scroll roll 26.

On the back of the front plate 28 of the machine, which fits within the open end of the casing 13, is a fixed plate 29 having a vertical slot 30 which constitutes a guide for a slide 31. This slide has a horizontal arm 32 projecting at right angles on which a flange on the roll 26 is adapted to rest. This flange is comparatively sharp and runs in the groove in the scroll wheel 24. The slide is provided with a rack 33 engaging a pinion 34 on a hollow stud 35 provided with a knurled hand wheel 36. Also this stud 35 carries a pointer 38. This hollow stud 35 is mounted on the shaft 15 and is freely rotatable thereon and is centered thereby with respect to the rest of the apparatus. The pointer 38 is turned by the hand wheel 36 to the desired point on a scale 55 to set the device to measure the number of yards so indicated on the scale. This action lifts the slide and arm 32 and therefore the roll 26. The latter will start from the point at which it is set and, as will be seen later, will move the rest of the distance along the rod 39.

The scroll wheel 24 has at the end of the scroll a fixed stud 40. When the roll 26 is gradually moved out along the scroll and caught in the extremity of the groove, which terminates in the stud 40, also grooved, the roll will ride up on this stud. This roll is mounted on a vertical rod 39 carried by a pivoted frame 41, normally held out in position for the roll to engage the scroll by means of a pointed spring latch 42 as shown in Fig. 12. When the roll 26 is positively forced backwardly by the stud 40 the back end of this plate 41 will pass over the inclined surface of the stud 42 and hold the plate to the position shown in Fig. 8. Then the roller no longer engages the wheel 24 and the measuring operation is stopped. The plate 41 has a rigid stop 43 adapted to engage the plate 28.

The movement of the plate 41 to again set the roll 26 back into the groove on the scroll wheel 24 is controlled by a hand lever 45 which can be operated by a link or cord 46 connected to the winding machine, not shown. This lever is pivoted by means of a round opening 47 and a stud 48 and has an opening 49 for receiving an arm 50 on a shaft 51. This shaft also has another arm 52 which has a notch 53 for engaging on both sides of the edge of the plate 41 at a distance from its pivots 44. The arm 52 is moved by the plate 41 to move the lever 45 and stop the winding machine when the roll is thrown out of the scroll. This, of course, stops the drawing of the yarn over the wheel 10 and its rotation.

It will be seen, therefore, that the downward movement of the arm 45 will swing the plate 41 about its pivot in a positive manner in opposition to the spring-pressed wedge-shaped stud 42 and that the roll 26 is moved back into engagement with the scroll and the stud 42 will hold it there until it is disconnected therefrom by the stud 40. The machine has to be set after it has once completed its operation but ordinarily that is all the attention that has to be given it. Of course, it can be stopped and restarted by this handle 45 at any time. When the roll 26 is moved back by the stud, the machine is set at zero by hand. At the top of rod 39 there is a spring 49 for providing a slight resistance against the roll 26 when it gets near the end of the scroll and is ready to engage the stud 40.

What has been described so far relates to the operation of the machine for measuring yarn in even thousands, or in such fractions thereof as can be gauged accurately on a circular scale 55 by means of the pointer 38. By reference to this scale it will be seen that a complete revolution of the pointer 38 is intended to show that 20,000 yards have been passed over the wheel 10 and that each of the divisions on the scale represents 250 yards. It is possible to set the scale then accurately at every 250 yards from zero to 20,000 yards. For the purpose of setting it at finer points a pointer 56 is employed which is rigidly mounted on the central shaft 15 on which the scroll wheel 24 is fixed. This pointer is provided with a pin 59 having a knurled handle 58. In the face of the instrument between the plate 28 and the cover 60 there is mounted a circular spring 61 having an end 62 extending inwardly radially and the other end not connected to it. This spring expands into the space between these two plates and can be turned in only one direction obviously. The projection 62 constitutes a gauge for the pointer 56. When the flexible pointer is pressed back this gauge acts as a stop for original setting, but when released the pointer springs forward and the gauge no longer acts as a stop for it and it passes the gauge at each revolution of the shaft 15.

The outside scale is numbered from zero to 200 and cooperates with the pointer 56 so that after the pointer 38 is set, as for example, to the point 17,500 this gauge 62 can be set further as for example, to the position 32½ as shown. The setting of the pointer 56 back to zero takes with it the scroll wheel 24. So after having been set by the pointer 38 to come back to zero upon the winding of 17,500 yards of yarn as shown, it will be set farther over so that the stud 40 will be offset from the zero point to allow 32½ yards more to be wound before the stud 40 reaches the zero point and moves the wheel 26 out of the groove. Thus, as shown in Fig. 1, the device is set to measure 17,532½ yards and then the measuring is automatically stopped through action of the lever 45 on the usual stopping means on the winder. All that has to be done then is to turn back the pointer 56 and pull the handle 45 and it will be set again to reel off the same amount.

Before starting the device, the pointer 38 is turned to the proper position and that turns the pinion 34 and moves the arm 32 along the rod 39 to the proper point. It is to be remembered that the roll 26 has a flange so that it never can pass below the arm 32 and this setting will carry this roll up to the proper position to begin operations, the roll resting on the arm. Now if the division on the inner scale is to be divided further the pointer 56 is turned to turn the wheel 24 and bring the point on the scroll back from zero a further distance. This does not affect the arm 32 but makes it necessary for the scroll wheel to rotate through a further arc in order to bring the stud 40 up to zero point and depress the wheel 26 and therefore turn the plate 41 from the position shown in Fig. 8. This constitutes the setting of the device.

Now in operation the roll 26 is gradually moved upwardly by the groove in the wheel 24 as that wheel continues its rotation until the stud 40 stops the operation. When the operation is stopped in this way the roll 26, of course, is removed from the groove in the wheel 24. There is nothing to support it so it drops back again on the arm 32. A spring 49 starts the roll down in case it should stick.

If the operation is to be repeated with the same yardage no attention has to be paid to the pointer 38 but the pointer 56 has to be turned back again to the same position it was in before and then the arm 45 is pulled down which again pulls the plate 41 over and moves the roll 26 into contact with the grooved surface of the plate 24 ready to measure the same yardage over again.

The method of changing it for a different yardage has already been explained. It may be mentioned that the pointer 56 is flexible and can be forced down by the handle 58 until the pin 59 engages behind the pointer 38 and then that pointer can be moved around conveniently by the handle 58.

The setting of the device is of the simplest possible character, the operation is certain and not dependent upon any springs, the use of gear trains and spring wire clutches are eliminated and the mechanism in general is reduced to very simple terms. The cost of production necessarily is reduced and also the number of parts that may get out of repair is very small.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:—

1. In a measuring device, the combination with a casing and a rod therein, of a flanged roll mounted to slide on said rod, an adjustable arm for setting the roll for the start of its operation, a scroll wheel rotatably mounted in said casing and having a scroll groove in which said roll will operate to move the roll along the rod in one direction as the wheel is rotated in one direction, said flanged roll being mounted to be moved out of the scroll groove, and means on the scroll wheel for throwing the flanged roll out of the scroll at the end of the operation.

2. In a measuring device, the combination with a casing and a rod therein, of a flanged roll mounted to slide on said rod, a scroll wheel rotatably mounted in said casing and having a scroll groove in which said roll will operate to move the roll along the rod in one direction as the wheel is rotated in one direction, a tilting plate on which said rod is mounted, means on the scroll wheel for throwing the flanged roll out of the scroll at the end of the operation, a lever having a forked end engaging the plate and adapted to move it back into operative position, and a pivoted re-starting lever adapted to operate the first named lever and restore the device to operative position again after it has been stopped.

3. In a measuring device, the combination with a casing and a shaft carried by said casing and a measuring wheel rotatably mounted thereon outside the casing, of a scroll wheel rotatably mounted within the casing, means operated from said shaft for rotating the scroll wheel in accordance with the rotation of the measuring wheel, a plate pivoted on a vertical axis in the casing, a vertical rod carried by the plate, and a flanged roll movable up and down said rod and adapted to engage in the scroll, said scroll wheel having a stop stud near its circumference for receiving said roll and throwing it out of the scroll.

4. In a measuring device of the character described, the combination with a casing, of a shaft, a movable plate, a spring-pressed stud for yieldingly holding the plate in either of two extreme positions, a rod carried by said plate, a flanged roll slidably mounted on said rod, an adjustable arm projecting into a position to limit the inward motion of the roll along the rod in one direction, a scroll wheel mounted in position in said shaft to be engaged by said flanged roll when the plate is in one of its extreme positions, whereby the rotation of the scroll wheel will move the roll along the rod in the opposite direction, a measuring wheel, means for connecting the measuring wheel with the scroll wheel for rotating it, means for setting the arm to determine the number of rotations of the scroll wheel before the roll will reach the edge of the scroll wheel, and a stud mounted on the scroll wheel near its edge and having a cam surface up which said roll will travel when it engages it to remove the roll from the scroll and set the plate in the opposite position.

5. In a measuring machine, the combination with a measuring wheel and a shaft driven therefrom, of a wheel fixed to the shaft and having a spiral groove on its face, means for turning said grooved wheel from the measuring wheel, a pivoted plate, a vertical rod carried by the pivoted plate, a flanged roll slidably mounted on the rod and adapted to engage in the groove on the grooved wheel when the plate is tipped toward the grooved wheel, whereby the roll is moved along on the rod by the rotation of the wheel, a stud on the grooved wheel near the circumference and constituting means for moving the flanged roll out of the groove, yielding means for then holding the tilting plate away from the grooved wheel, an arm projecting into a position to engage the flanged roll and fix its starting position, and means whereby said arm can be set to fix the limit of the distance of travel of the roll at which the roll will be forced out of the groove.

6. In measuring device, the combination with a casing and a shaft carried by said casing and a measuring wheel thereon outside the casing, of a scroll wheel rotatably mounted within the casing, means operated from said shaft for rotating the scroll wheel in accordance with the rotation of the measuring wheel, a shaft on which said scroll wheel is fixed, a plate pivoted on a vertical axis in the casing, a vertical rod carried by the plate, a flanged roll movable up and down said rod and adapted to engage in the scroll, said scroll wheel having a stop stud near its circumference for receiving said roll and throwing it out of the scroll, the casing having a scale thereon, a pointer fixed to the shaft on which the scroll wheel is mounted and adapted to be moved over the scale to turn the stud back from the zero point of the scale and control the amount of rotation of the scroll wheel through a part of a circumference before the flanged wheel is thrown out of the scroll by the stud.

7. In a measuring device of the character described, the combination with a casing, of a vertical sliding rack thereon having an arm projecting therefrom, a gear meshing with the rack for adjusting it, a shaft on which said gear is freely mounted, a plate mounted to tilt and capable of being placed in two extreme positions, a vertical rod carried by said plate, a flanged roll slidably mounted on said rod, the arm projecting into a position to support the roll in all positions of the plate, a scroll wheel rotatably mounted in position to be engaged by said flanged roll when the plate is in one of its extreme positions, whereby the rotation of the scroll wheel in one direction will move the roll up the rod, means cooperating with said gear for setting the rack to determine the number of rotations of the scroll wheel before the roll will reach the edge of the scroll wheel, a stud mounted on the scroll wheel and having a cam surface up which said roll will travel when it engages it to remove the roll from the scroll and move the tilting plate, a shaft on which said scroll wheel is fixed, and means for setting said shaft so as to increase the measurement to be made in the material by offsetting the stud from the zero point throughout an arc of a circle.

8. In a measuring machine, the combination with a measuring wheel and a central shaft driven from the measuring wheel, of a wheel fixed to the central shaft and having a spiral groove on its face, means for turning said wheel from the measuring wheel, a pivoted plate, a vertical rod carried by the pivoted plate, a flanged roll slidably mounted on the rod and adapted to engage in the groove on the grooved wheel when the plate is tipped toward the grooved wheel, a stud on the grooved wheel near the circumference and constituting means for moving the flanged roll out of the groove, yielding means for then holding the tilting plate away from the grooved wheel, a gear freely rotatable on said shaft, a vertical rack meshing with said gear, an arm on said rack projecting into a position to engage the flanged roll and support it, and a pointer fixed with respect to said gear, the machine having a double scale with which said pointer cooperates.

9. In a measuring machine, the combination with a measuring wheel and a shaft connected to be driven therefrom, of a wheel fixed to the shaft and having a spiral groove on its face, means for turning said wheel from the measuring wheel, a pivoted plate capable of resting in different positions, a vertical rod carried by the pivoted plate, a flanged roll slidably mounted on the rod and adapted to engage in the groove on the grooved wheel when the plate is tipped into one position, a stud on the grooved wheel near the circumference and constituting means for moving the flanged roll out of the groove, yielding means for then holding the tilting plate in another position, a pointer rotatable on said shaft, an arm projecting into a position to engage the flanged roll and support it, the machine having a double scale with which said pointer cooperates to indicate one part of yardage in thousands, means whereby the motion of said pointer will move said arm and fix the limit at which the roll will be forced out of the groove, a second pointer fixed to said shaft and cooperating with the other part of said double scale to indicate individual yards, and means whereby the second pointer can be turned to turn the grooved wheel back so that its stopped stud will be located at any desired distance from the zero point so that additional yardage will be wound before the measuring operation is stopped.

10. In a measuring machine, the combination with a measuring wheel over which the material to be measured is adapted to pass, a worm wheel, and means operated by the measuring wheel for rotating the worm wheel, said worm wheel having a recess, of a flat disc carried within said recess in the worm wheel and having a slit extending diametrically substantially all the way across it and a slot extending at one side of said slit, a scroll wheel, a shaft on which the scroll wheel is fixed and on which shaft the worm wheel is freely rotatable, said scroll wheel having a projection extending into said slot, whereby the motion of rotation of the wheel will be transmitted to the scroll wheel and shaft, but the scroll wheel can be turned independently of the worm wheel in one direction, and a pointer fixed on said shaft, the machine having a scale over which the pointer turns.

11. In a measuring machine, the combination with a measuring wheel over which the material to be measured is adapted to pass, a worm wheel having a recess therein, means operated by the measuring wheel for rotating the worm wheel and a shaft on which the worm wheel is rotatably mounted, of a flat disc carried in the recess in the worm wheel and having a slit extending diametrically substantially all the way across it and a slot extending at one side of said slit, and a scroll wheel having a projection extending into said slot, whereby the motion of rotation of the worm wheel will be transmitted to the scroll wheel and shaft.

12. In a measuring device, the combination with a measuring wheel adapted to be rotated by the material to be measured, a shaft on which said wheel is fixed and a worm on said shaft, of a worm wheel meshing with the worm, a second wheel rotatable on the same axis as the worm wheel and having a scroll groove thereon, the worm wheel having a circular central recess, a disc located in said recess and split almost entirely across, and a projection on the scroll wheel engaging said disc on one side of the slit.

JOHN A. ADELL.